(12) United States Patent
Chiba et al.

(10) Patent No.: US 6,210,146 B1
(45) Date of Patent: Apr. 3, 2001

(54) FRICTION COMPONENT MANUFACTURING APPARATUS AND METHOD

(75) Inventors: Masanori Chiba; Takayuki Kato, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/197,975

(22) Filed: Nov. 23, 1998

(30) Foreign Application Priority Data

Dec. 10, 1997 (JP) .................................................. 9-339544
Sep. 28, 1998 (JP) ................................................ 10-272705

(51) Int. Cl.[7] .................................................. B29C 45/44
(52) U.S. Cl. .......................... 425/327; 425/327; 425/352; 425/357; 425/353; 425/356
(58) Field of Search ..................... 425/327, 542, 425/352, 353, 356

*Primary Examiner*—Richard Weisberger
(74) *Attorney, Agent, or Firm*—Muramatsu & Associates

(57) ABSTRACT

To provide a friction component of a multilayer structure in which each layer can be formed so as to have a specified thickness, as well as its manufacturing apparatus and method.

A side plate 3 having a void 3a of a specified depth formed therein is provided between a plunger 2 and a fixed mold 5 so as to move in the horizontal direction. A hopper 6 for adhesive-layer materials is provided near a molding box 1. An output port 6a in the hopper is located so as to contact slide plate 3. When the side plate 3 is moved in the lateral direction in the figure so that the void 3a is located under the hopper 6, the lower end surface 6b of the hopper acts as a leveling plate to feed an adhesive-layer material 8 into the void. The adhesive-layer material is moved to the lower part of the molding box 1, a specified amount of friction material 9 is fed in such a way that its thickness becomes uniform, and the plunger is then used to pressurize and mold the materials. By placing a plurality of slide plates one on another, a multilayer structure having three or more layers can be obtained.

6 Claims, 9 Drawing Sheets

FRICTION COMPONENT MANUFACTURING APPARATUS AND METHOD

FIELD OF THE INVENTION

The present invention relates to a friction component such as a brake lining or a clutch facing, and in particular, to an apparatus and method for manufacturing a friction component in which that portion of a friction material which is attached to a back plate has a multilayer structure.

DESCRIPTION OF THE RELATED ART

Many friction components such as brake linings and clutch facings constitute the products by attaching to a friction material a metal plate called a back plate, as in brake shoe assemblies, clutch disc assemblies, or disc pads; however, some products, such as brake linings, are made of friction materials alone.

In addition, the friction material is formed by mixing together a fibrous material, a filler, and a binder. A powdery material comprising a mixture of these materials is placed in a molding box and pressurized and heated by a press machine to form a friction component. Two methods are used for molding: one uses a press machine to mold a temporary molding from a powdery friction material, uses another press machine to place the temporary molding on the back plate, and then pressurizes and heats the molding for adhesive molding, and the other directly attaches a powdery friction material to a back plate using a press machine.

The term "friction component," used herein, refers not only to a friction component with or without a back plate but also to a temporary molding unless otherwise specified.

Methods for adhering the friction material and the back plate together include the provision of an adhesive layer or the use of a binder contained in the friction material. If an adhesive layer is formed, a two-layer structure is used.

A conventional molding of a two-layer structure is obtained by measuring the weights of a friction material and an adhesive-layer material, both powdery, spreading the adhesive-layer material throughout a mold in such a way that the material has uniform thickness, placing the frictional material on the adhesive-layer material, and using a press machine to pressurize the materials in order to form a temporary molding. If no temporary molding is used, the adhesive-layer material and the friction material are placed next to another, a back plate is placed into direct contact with the adhesive-layer materials, and a press machine is used to pressurize and heat the materials for molding.

SUMMARY OF THE INVENTION

The conventional method, however, measures the weights of the powdery materials used to form the adhesive layer and manually or automatically levels predetermined amounts of the materials in such a way that they have a uniform thickness, so the thickness of the layer varies significantly. Normally, the thickness of the friction material is about 10 to 25 mm, whereas the adhesive layer is thin and has a thickness of 1 to 2 mm. If variations in thickness result in an excessively thin layer portion, the adhesive strength of this portion becomes insufficient. In addition, the conventional technique fails to provide a uniform thickness, so the adhesive layer is formed to be generally thick to prevent the declines in adhesive strength associated with thin layer portions.

Thick portions of the adhesive layer are also prone to problems. In such a portion, if the friction material becomes worn, the adhesive layer is exposed excessively early, thereby degrading elements of friction performance such as friction coefficient, wear, and fade resistance.

With respect to the friction material placed on the adhesive layer, the properties required for the surface side pressed against a disc are not the same as those required for the side closer to the back plate. For example, even in the same friction component, the surface side requires friction characteristics such as a stable friction coefficient and biased-wear resistance, while the side closer to the back plate requires strength-related characters such as toughness and cracking resistance. Thus, the friction materials are desirably structured to have multiple layers that meet the requirements for the respective portions. To achieve this, a plurality of types of powdery friction materials having different compositions are provided and placed on one another in a predetermined order to form a multilayer structure.

It is difficult, however, to provide each layer with the specified thickness when the above conventional method is used to provide a multilayer structure.

This invention is proposed to solve this problem, and its object is to provide a friction component manufacturing apparatus and method for providing a friction component for a multilayer structure having two or more layers wherein each layer can be formed so as to have a specified thickness. It is another object of this invention to provide a friction component suitable for use in this manufacturing apparatus and method.

To achieve these objects, this invention provides an apparatus for manufacturing a friction component having a multilayer structure by feeding sequentially two or more types of powdery materials into a molding box, executing either vertical pressurization or pressurization and heating between a fixed mold and a plunger that can elevate up and down into the molding box, so as to form a temporary molding or a molding, characterized in that a slide plate having a void of a predetermined shape formed therein is provided between the molding box and the fixed mold, in that a hopper for the powdery materials having an output port is provided on the slide plate, and in that the slide plate can be moved in the horizontal direction so that the output port is open over the void in the slide plate while being blocked at other positions.

In addition, the void may be a hole formed so as to penetrate the slide plate and a bottom plate that blocks the bottom of the hole may be provided so as to slide over the slide plate. The slide plate and/or said bottom plate may constitute a split mold. A back plate holding section in communication with the void may be formed in the lower part of the slide plate.

Alternatively, one or two or more slide plates may be placed on said slide plate so as to move independently in the horizontal direction. A hole constituting part of the void may be formed in each of the overlapping plates so as to penetrate them. A bottom plate blocking the bottom of each void may be sidably provided. A hopper for the powdery material having an output port may be provided in each slide plate. The output port may be open over the void in the slide plate while being blocked at the other positions.

The present method for manufacturing a friction component having a multilayer structure by executing either vertical pressurization or pressurization and heating between a fixed mold and a plunger that sequentially feeds a plurality of types of powdery materials into a molding box so as to form a laminate and that can elevate up and down into the molding box, is characterized in that the method comprises using any of the above friction component manufacturing apparatuses to move one, two or more slide plates in the horizontal direction in order to move each void beneath the output port in the corresponding hopper, thereby enabling the powdery materials in each hopper to be dropped into the void; moving the slide plates in the horizontal direction to allow the output port to be used as a leveling plate to sufficiently fill each void with the powdery material; moving all voids beneath the molding box in such a way that the voids overlap the molding box; feeding a predetermined amount of the final powdery material into the molding box; and executing either pressurization or pressurization and heating between the plunger and the fixed mold to temporarily or otherwise mold a friction component of a multilayer structure.

In this case, the bottom layer of the friction component may be an adhesive layer.

A friction component according to this invention is characterized in that a friction component of a multilayer structure has at least one layer containing 4% or less of fibrous components of 500 µm or more fiber length. Alternatively, the layer containing 4% or less of fibrous components of 500 µm or more fiber length may further contain 2 to 30% of adhesive organic filler. The layer containing 4% or less of fibrous components may be an adhesive layer, and 1.5 to 3.0% of the 4% of fibrous components may be metal fibers.

BRIEF DESCRIPTION OF THE DRAWINGS

The present invention will be more apparent from the ensuring description with reference to the accompanying drawings, wherein.

DETAILED DESCRIPTION OF THE INVENTION

Embodiments of this invention are described below with reference to the drawings.

Figure 1:
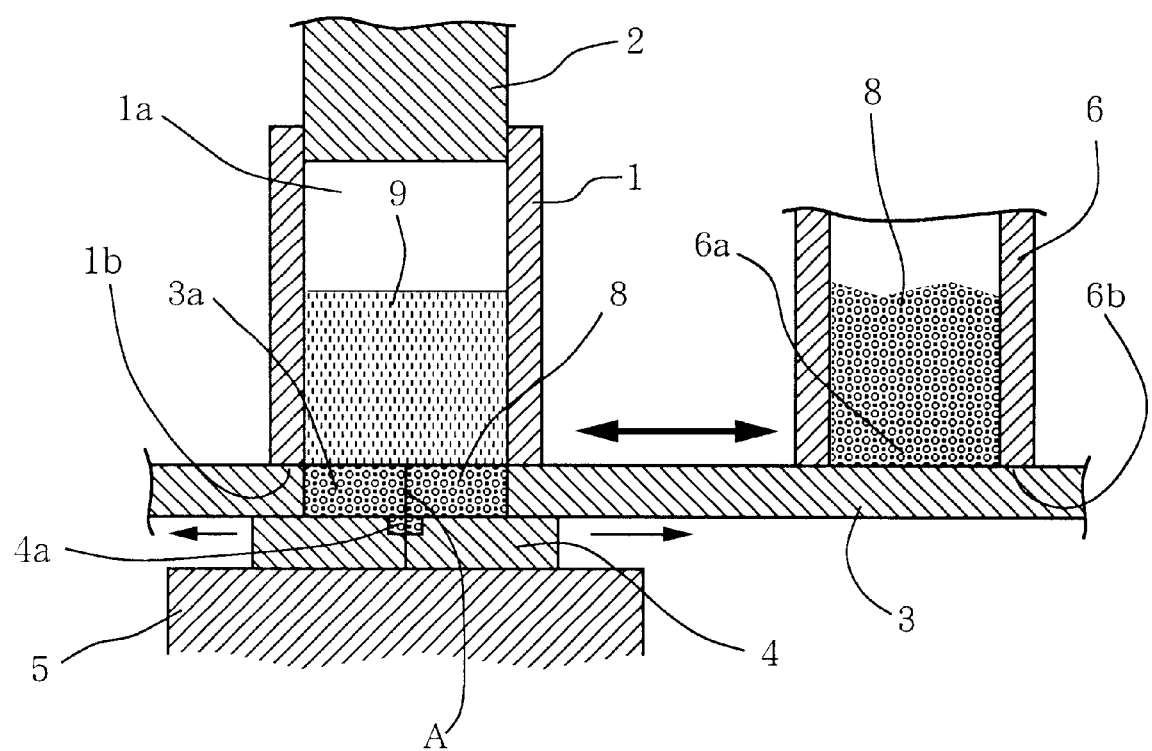
FIG. 1 is a vertical sectional view showing the integral part of a friction component manufacturing apparatus according to this invention.
Figure 2:
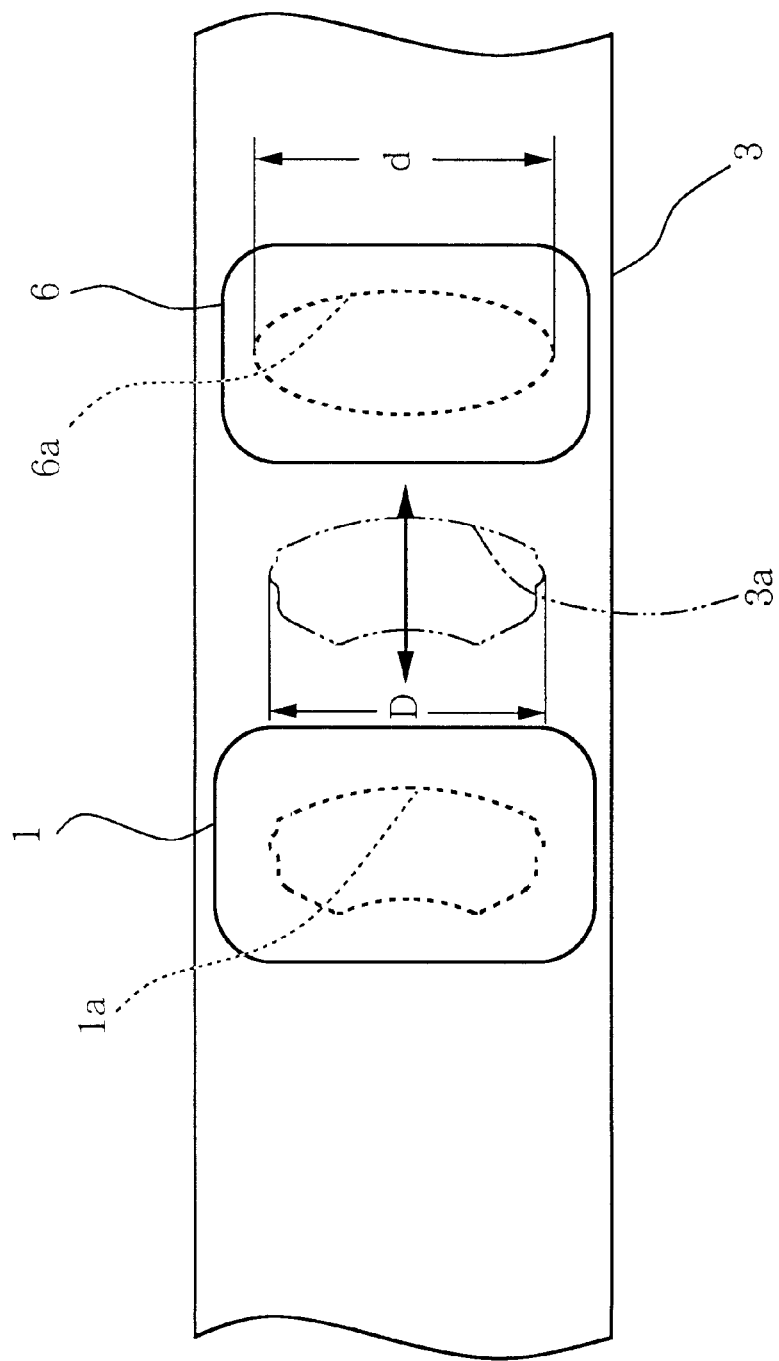
FIG. 2 is a top view of the manufacturing apparatus in FIG. 1.
Figure 3A:
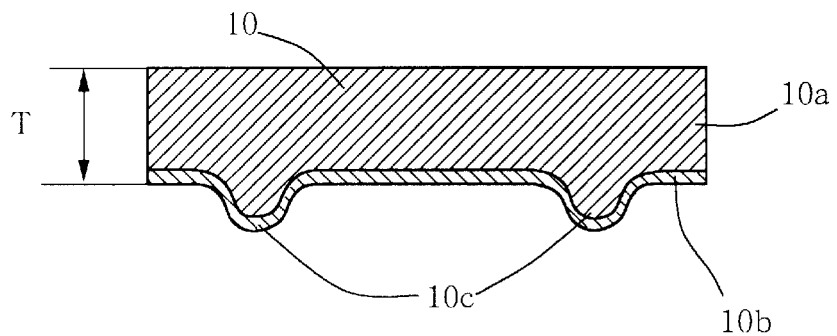
FIG. 3(a) and FIG. 3(b) show a temporary molding and FIG. 3(c) is a sectional view of a friction component comprising a friction material and a back plate attached together.

FIGS. 1 and 2 show a first embodiment of an apparatus for manufacturing a friction component according to this invention. FIGS. 3(a) and (b) show a temporary molding and a friction component 12 (a disc pad) having this temporary molding attached to a back plate.

Figure 3B:
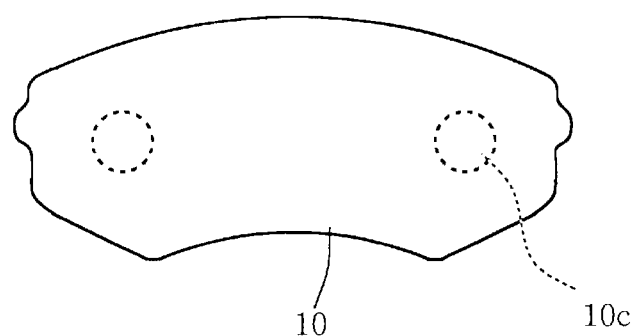

A temporary molding 10, which is shown in FIG. 3(a) and FIG. 3(b), is formed into the disc pad 12 in (c) and has a two-layer structure having a friction material layer 10a and an adhesive layer 10b located under the layer 10a. The temporary molding 10 also has two circular boss sections 10c. The temporary molding 10 is attached to a back plate 11 to complete the disc pad 12.

Figure 3C:
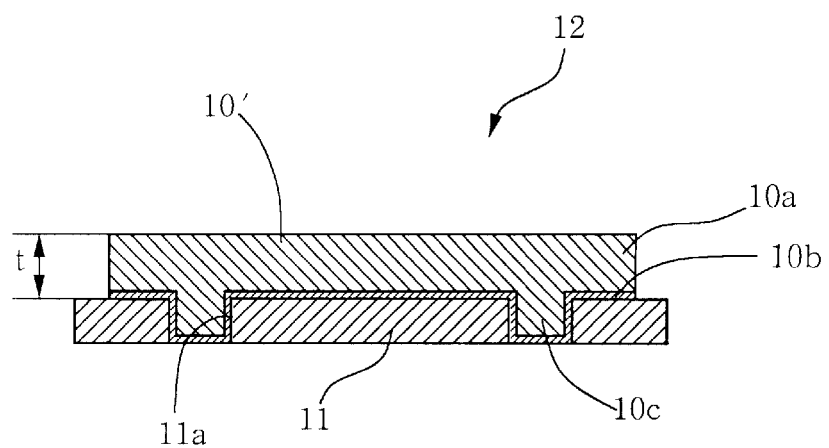

The temporary molding 10 and the back plate 11 are attached together as follows. First, the temporary molding 10 is placed on the back plate in such a way that the boss sections 10c overlap bonding holes 11a formed in the back plate 11. Then, the temporary molding is set in a press machine for pressurization and heating. As shown in FIG. 3c, the temporary molding 10 is fixed to the back plate as a friction material 10 that has been compressed in such a way that its thickness (T) is reduced by half (t). These components constitute the disc pad 12. Then, the boss sections 10c advance into the binding holes 11a to enhance the binding force between the friction material 10 and the back plate.

FIGS. 1 and 2 show the integral part of an apparatus for manufacturing the temporary molding 10 (a press machine). FIG. 1 is a vertical sectional view and FIG. 2 is a top view. In these figures, a molding box 1 has a cylindrical space 1a having the same horizontal cross section as a friction material, that is, the temporary molding 10, and a plunger 2 is inserted into the space from above so as to elevate and lower itself. The lower end surface 1b of the molding box 1 is flat.

A slide plate 3 is arranged so as to contact the lower end surface 1b of the molding box 1. The slide plate 3 has a void 3a of the same shape as the friction material penetrating the plate, with the bottom of the hole blocked by a bottom plate 4. The bottom plate 4 a and the slide plate 3 can be moved in the horizontal direction, and when the void 3a is directly under the molding box 1, the bottom plate 4 is placed on a fixed mold 5 of a press machine. The bottom plate 4 has recessed portions 4a corresponding to the boss sections 10c of the temporary molding 10, and the slide plate 3 and the bottom plate 4 have a split mold structure such that they can be laterally split along a line A passing through the center of the recessed portions 4a.

The slide plate 3 positioned horizontally in the figure, and contacts an output port 6a in a hopper 6, which is shown in the right of the figure. A powdery material 8 is accommodated in the hopper 6 to form the adhesive layer 10b. The lower end surface 6b of the output port 6a in the hopper 6 is flat and is blocked by the slide plate 3.

Next, a method is described that manufactures a temporary molding using the above apparatus. A drive means (not shown) is used to move the slide plate 3 and the bottom plate 4 in such a way that the void 3a passes under the output port 6a in the hopper. The powdery material 8 in the hopper 6 falls into the void 3a and recessed portions 4a, and the lower end surface 6b of the output port 6a acts as a leveling plate to fill exactly the powdery material 8 into the void 3a and recessed portions 4a that each act as a measure. If one reciprocating motion of the void 3a under the output port 6a is insufficient, the powdery material can be reliably filled by reciprocating the void several times.

As shown in FIG. 2, a relationship d>D is established between the diameter D of the void 3a and the diameter (d) of the output port 6a, where each is measured in the direction perpendicular to the moving direction of the slide plate 3. Thus, the powdery material 8 can be filled in the void 3a by linearly reciprocating the slide plate 3 as shown in the figure. If, however, d<D, the illustrated linear reciprocating motions cannot allow the void 3a to be sufficiently filled. Thus, in such a case, the void is also reciprocated in the direction perpendicular to the illustrated direction.

Once the void 3a and the recessed portions 4a are filled with the powdery material 8, the slide plate 3 is moved so that the void 3a is located directly under the molding box 1.

Next, a specified weighed amount of a powdery friction material 9 is fed into the molding box 1 and spread in such a way that its thickness becomes uniform.

Then, the press machine presses a plunger 2 to pressurize a laminated portion of the friction material 9 and powdery material 8. The materials may be heated as required, but these binding materials must only be loosely bound together to provide the temporary molding 10 shown in FIG. 3.

Once the temporary molding 10 has been completed, the slide plate 3 and the bottom plate 4 are laterally split along a line A constituting the center of the recessed portion 4a. The temporary molding 10 is ejected onto the fixed molding 5 of the press machine. The temporary molding 10 is subsequently transferred to the next step using a conveyor, but the boss sections 10c may contact the conveyor, and it may give some damages to the boss sections. Accordingly, the temporary molding 10 is desirably inverted in the vertical direction and transferred in such a way that the boss sections 10a face upward.

vertical direction, and the temporary molding 10 may be taken out through a gap resulting from the separation.

In the temporary molding 10 shown in FIG. 3, the adhesive layer 10b is formed of the powdery material 8 filled in the void 3a, so as to be uniform in thickness. Thus, the adhesive layer is not necessarily formed so as to be thick as in the prior art, but can instead have a minimum required thickness.

When attached to the back plate 11 to complete the friction component, the adhesive layer effectively has a thickness of 0.05 to 2.0 mm—preferably between 0.2 and 1.5 mm. At less than 0.2 mm, the adhesive strength significantly varies to reduce stability. Beyond 1.5 mm, the adhesive layer may contribute to causing friction.

Although, in the above embodiment, the void 3a, that is, the adhesive layer 10b has the same shape as the friction material layer 10a, this aspect is not always required; one layer may be larger than the other. For example, the friction material layer 10a may be extended over the edges of the adhesive layer lob by several mm in such a way as to wrap the layer 10b.

According to this invention, the friction material 9 that is directly fed into the molding box 1 may be conventional, but for the powdery material 8 that is filled in the hopper 6, the form of powders used is important. The powdery material 8 normally comprises a mixture of a binder, a fibrous material, and a filler. The binder comprises a thermosetting resin, the fibrous material comprises organic, inorganic, or metal fibers, and the filler comprises metal pieces/powders, an organic or inorganic filler, or an adhesive organic filler. Table 1 illustrates the respective compositions of eight embodiments and three comparative examples of this invention. The percentage in the table indicates volume %. The pressure required to form a temporary molding is 200 kgf/cm$_2$.

TABLE 1

| Material | Embodiment 1 | Embodiment 2 | Embodiment 3 | Embodiment 4 | Embodiment 5 | Embodiment 6 | Embodiment 7 | Embodiment 8 | Comparative Example 1 | Comparative Example 2 | Comparative Example 3 |
|---|---|---|---|---|---|---|---|---|---|---|---|
| Organic and inorganic fibers | 0.0 | 1.0 | 2.5 | 1.5 | 1.5 | 1.5 | 1.0 | 1.0 | 5.0 | 1.0 | 1.0 |
| Metal fibers | 1.5 | 1.5 | 1.5 | 1.5 | 1.5 | 1.5 | 3.0 | 1.5 | 1.5 | 1.5 | 5.0 |
| Adhesive organic filler | 15.0 | 15.0 | 15.0 | 5.0 | 20.0 | 30.0 | 15.0 | 1.0 | 15.0 | 50.0 | 15.0 |
| Organic filler | 10.0 | 10.0 | 10.0 | 10.0 | 10.0 | 10.0 | 10.0 | 10.0 | 10.0 | 10.0 | 10.0 |
| Inorganic filler | 48.5 | 47.5 | 46.0 | 57.0 | 42.0 | 32.0 | 46.0 | 61.5 | 43.5 | 12.5 | 44.0 |
| Metal piece/powders | 3.0 | 3.0 | 3.0 | 3.0 | 3.0 | 3.0 | 3.0 | 3.0 | 3.0 | 3.0 | 3.0 |
| Thermosetting resin | 22.0 | 22.0 | 22.0 | 22.0 | 22.0 | 22.0 | 22.0 | 22.0 | 22.0 | 22.0 | 22.0 |
| Total | 100.0 | 100.0 | 100.0 | 100.0 | 100.0 | 100.0 | 100.0 | 100.0 | 100.0 | 100.0 | 100.0 |
| Leveling capability | ◎ | ○ | Δ | ○ | ○ | ○ | Δ | ○ | x | ○ | x |
| Handling | ○ | ◎ | ◎ | Δ | ◎ | ◎ | ◎ | x | ○ | ○ | ○ |
| Hot strength | Δ | ○ | ◎ | ◎ | ○ | Δ | ◎ | Δ | ○ | x | ◎ |

The number in the table indicate volume %

Although the slide plate 3 and the bottom plate 4 have a two-piece structure, they may be split into three or need not necessarily have a split structure. If they do not form a split mold that is split into, for example, two and the recessed portions 4a are not provided, only the bottom plate 4 is slided and the plunger 2 can be used to press down the temporary molding 10, which can then be taken out. Even with the recessed portions 4a, the bottom plate 4 and the slide plate 3 may be configured so as to be separated in the The organic fibers include alamide, cellulose, and acrylic fibers, the inorganic fibers include rock fibers, glass fibers, and sepiolite, and the metal fibers include stainless steel, steel, copper, brass, and bronze fibers.

The fibrous material is added in order to provide various characteristics such as strength, toughness, and heat conductivity to the adhesive layer after adhesive hardening. The characteristics other than toughness can be complemented by other materials, but the fibrous material is the most suitable for providing toughness. Without the fibrous material, the adhesive layer will become very brittle, and in particular, the adhesive layer may be peeled off from the friction material layer, making handling difficult. At the same time, this invention fills the void 3a with the material and uses the lower end surface 6b of the hopper 6 to level the material so as to measure a specified amount. Accordingly, when an excessively large amount of fibers are present, the fibers may inappropriately engage one another, resulting in non-uniform filling.

Thus, the powdery material according to this invention contains a minimum amount of fibrous material in order to produce sufficient toughness while being more powdery than conventional friction materials.

The organic, inorganic, and metal fibers are 500 $\mu$m or more in fiber length. That is, at 500 $\mu$m or less, the material can be generally handled as a powder and allows appropriate leveling, whereas beyond 500 $\mu$m, the fibers may inappropriately engage one another during leveling, resulting in non-uniform filling. The upper limit for fiber length, on the other hand, is about 5 mm. That is, even if a thin adhesive layer is formed, this limit is empirically known to prevent the metal fibers from protruding from the adhesive layer and to allow appropriate leveling.

In addition, the metal fibers are used separately from the organic and inorganic fibers because they are desirable in maintaining the high-temperature strength of the adhesive layer. In particular, when the adhesive layer is 1 mm or less in thickness, about 1.5% of metal fibers are desirably mixed, with stainless steel fibers in particular providing very excellent high-temperature strength characteristic.

The organic filler includes cashew dust and tier grains (a ground material), and the inorganic filler includes whisker materials such as potassium whiskers titanate and SiC whiskers and any inorganic granular or powdery materials such as barium sulfate, calcium carbonate, barmicuhte, mica, graphite, and slaked lime.

The adhesive organic filler includes any powdery or granular adhesive organic materials, for example, rubber materials such as NBR and SBR. The addition of such an adhesive organic filler makes the entire powdery material wettish to loosely bind the powders (grains) together, thereby allowing the material to maintain an appropriate shape in the void more easily. This binding force, however, is not excessively strong but is sufficient to allow the powders to be simply separated when leveled by the output port in the hopper or the edge of the void.

Thus, the adhesive organic filler is mixed in the powdery material according to this invention, but if an insufficient amount of filler is used the above effects cannot be obtained. And by contrast, an excessively large amount of the filler may cause the material to be softened due to the former's organic properties—and reduce its strength under high temperature.

The tire grains in the organic filler are also a rubber material. These grains, however, are formed by grinding tires and have already been hardened, so they lack adhesion sufficient to loosely bind the powders together. Thus, they are excluded from the adhesive organic filler according to this invention.

The leveling capability indicates how well the powdery materials are leveled, despite any mutual engagement among the fibers, when filled in the void using the reciprocating motion of the slide plate. The double circles denote that no engagement was observed; circles denote slight engagement that did not affect leveling; triangles, engagement but with acceptable overall results; and crosses, notable engagement that hindered filling.

"Handling" indicates how easily the temporary molding can be handled. That is, it indicates whether temporary moldings are cracked or chipped easily when re-stacked or transported or whether the surface layer of a temporary molding of a multilayer structure is easily peeled off. Here, double circles denote that cracking, chipping, or peeling is unlikely to occur; circles, that chipping rarely occurs but does not substantially affect the molding; triangles, that chipping and peeling occur but do not affect the usability of the molding; and crosses, that chipping and peeling frequently occur to degrade usability.

Handling can be improved by increasing the pressure during temporary molding; however, excessive increases in pressure result in cracks or an inappropriate appearance. Thus, pressure cannot be simply increased. Handling affects only temporary moldings; it does not relate to moldings directly attached to the back plate.

The high-temperature strength is an index indicating a decrease in adhesive strength when a molding, which is applied to, for example, a brake, becomes hot. Here, double circles denote that for an adhesive strength of 40 kgf/cm$^2$ or more at room temperature, adhesive strength remains at 80% or more at higher temperatures. Circles denote adhesive strength of 70% or more at higher temperatures; triangles, adhesive strength of 60% or more; and crosses, adhesive strength of less than 60%.

Embodiment 1 contains 1.5% of fibrous components and 15% of adhesive organic filler. Its high-temperature strength is insufficient but does not affect the molding, so this embodiment is generally satisfactory. Embodiment 2 contains 2.5% of fibrous components and 15% of adhesive organic filler and is satisfactory in leveling capability, handling, and high-temperature strength. Embodiment 3 contains 4% of fibrous components and 15% of adhesive organic filler. Slight engagement was observed due to the larger amount of fibrous components but did not affect useability. Embodiment 4 contains 3% of fibrous components and 5% of adhesive organic filler. Its handling is slightly unsatisfactory due to the smaller amount of adhesive organic filler, but its high-temperature strength is high. Thus, this embodiment is generally satisfactory. Embodiment 5 contains only 3% of fibrous components but the amount of adhesive organic filler is increased to 20%. As a result, despite a slightly lower high-temperature strength, this embodiment is generally satisfactory. Embodiment 6 contains only 3% of fibrous components but the amount of adhesive organic filler is further increased to 30%. As a result, despite an insufficient hot strength, this embodiment is generally satisfactory. Embodiment 7 contains 4% of fibrous components mostly composed of metal fibers, which occupy 3% of the embodiment, but this embodiment is generally similar to Embodiment 3. Embodiment 8 contains 2.5% of fibrous components as in Embodiment 2 but a smaller amount (i.e., 1%) of adhesive organic filler, so the handling of the molding is unsatisfactory. If however, this embodiment is not formed into a temporary molding, it is usable.

Comparative Examples 1 and 3 contain 15% of adhesive organic filler, which is the same as in Embodiments 1 to 3. Due to the presence of 6.5% fibrous components, however, these examples have an unacceptable leveling capability so they are generally inappropriate. Comparative Example 2 contains the same amount of fibrous components as in Embodiments 1 and 2, but contains a larger amount (i.e., 50%) of adhesive organic filler. Consequently, it has a low high-temperature strength and is thus inappropriate.

These results show that without a temporary molding, the permissible level of fibrous components is 4% or less, with a desirable range of 3% or less. With a temporary molding, in addition to 4% or less of fibrous components, 2 to 30% of adhesive organic filler must be mixed. In this case, the desirable mixing range is 5 to 20%.

Figure 4:
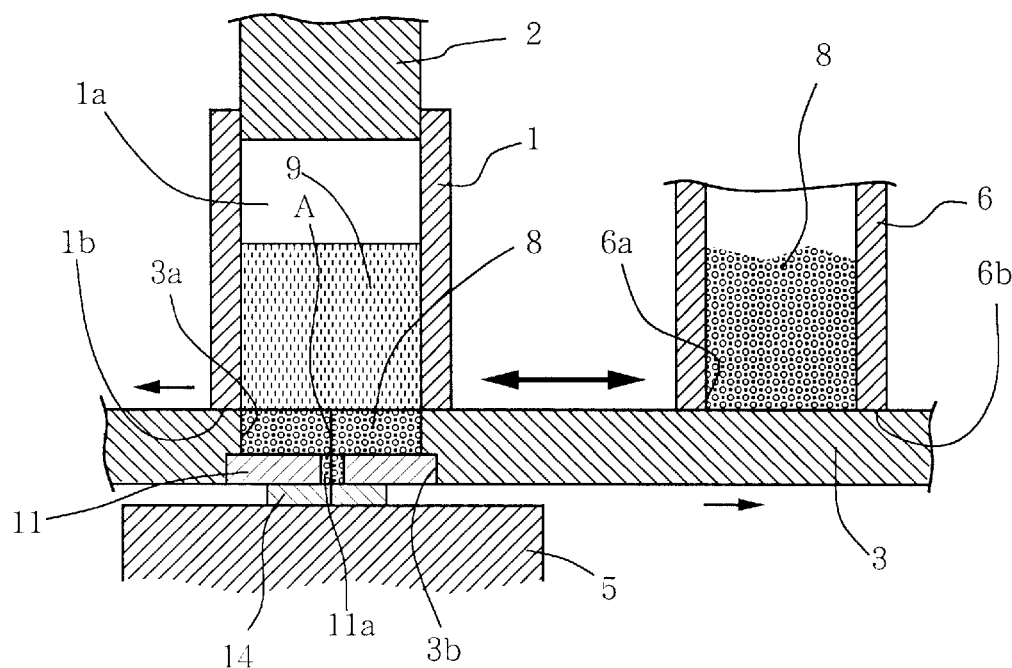
FIG. 4 is a vertical sectional view showing a second embodiment of a friction component manufacturing apparatus according to this invention.

FIG. 4 shows a second embodiment of a friction component manufacturing apparatus according to this invention. This manufacturing apparatus manufactures a finished product having a friction material directly attached to a back plate without producing a temporary molding. Most of the components are common to the embodiment in FIG. 1, so the configuration of the second embodiment is described below by focusing on differences from the embodiment in FIG. 1.

The slide plate 3 is thicker than that shown in FIG. 1, and a back plate holding section 3b is formed in the lower part of the void 3a in such a way to communicate with the void. The back plate holding section 3b is normally larger than the void 3a into which the friction material is fed, and the back place 11 is accommodated in this section. In addition, a bottom plate 14 is provided on the bottom of the back plate 11 to support it. The bottom plate 14 serves to block the bottom of a binding hole 11a (see FIG. 3).

In this configuration, the back plate 11 is accommodated in the back plate holding section 3b and is supported by the bottom plate 14 from under the back plate. The slide plate 3 is moved to move the void 3a beneath the output port 6a in the hopper. In this case, if the slide plate 3 has a two-piece structure such that the back plate holding section 3b grips the back plate 11 from both lateral directions, the back plate 11 does not need to be supported from below with the bottom plate 14. However, as long as the binding hole 11a penetrates the back plate 11, the bottom plate 14 is required because the friction material may leak through this hole.

As in the apparatus in FIG. 1, the slide plate 3, the back plate 11, and bottom plate 14 are slid together, and the powdery materials are fed into the void 3a. These plates are moved to directly under the molding box 1, and the friction material is fed. Subsequently, the bottom plate 14 is drawn out to the right or left. In this case, the bottom plate 14 may have a two-piece structure and may be drawn out in both lateral directions. Subsequently, the plunger is used to pressurize and heat the laminate in order to obtain a finished friction component.

The bottom plate 14 can be slid between the back plate 11 and the slide plate 3 in the horizontal direction. The bottom plate 14, however, may be pressurized and heated together with the back plate without being drawn out, and may subsequently be released from the molded product. In this case, however, the bottom plate 14 is desirably larger than the back plate 11. This is because warp is likely to occur unless the pressure during molding is received by the overall surface of the back plate. In this case, the bottom plate 14 does not need to have a split structure.

Although, in the above embodiments, the slide plate 3 and the bottom plate 4 (and even the bottom plate 14) have a two-piece structure, they may be split into three or more pieces by changing the arrangement of the boss sections. Depending on the constitution of the press machine, the slide plate 3 may be moved downward and pulled out from the temporary molding after press working, thereby eliminating the need for the split mold structure.

Figure 5:
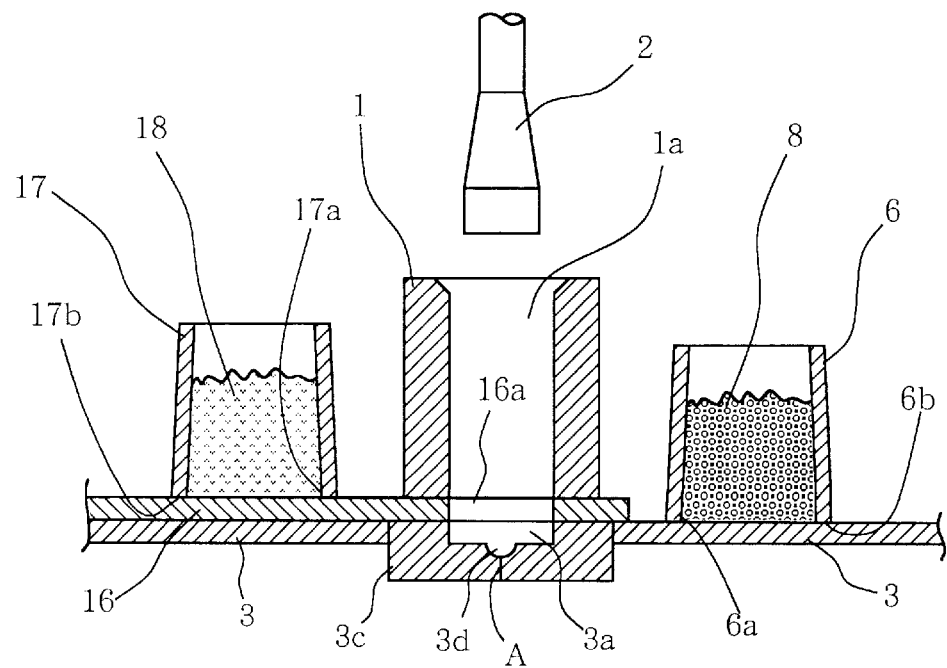
FIG. 5 is a vertical sectional view showing a third embodiment of a friction component manufacturing apparatus according to this invention.
Figure 6:
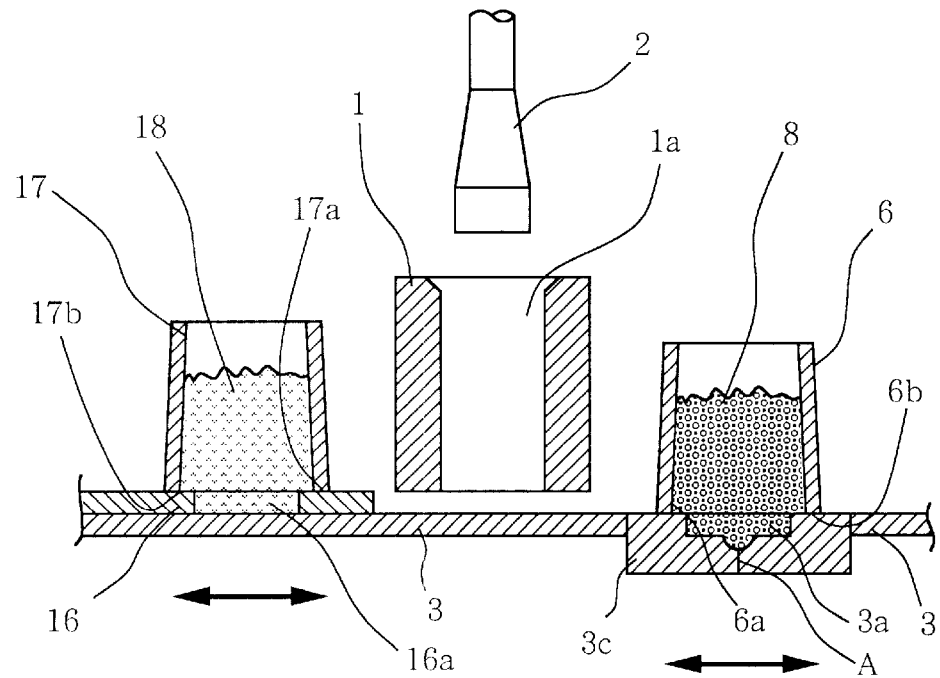
FIG. 6 shows an operation of the manufacturing apparatus in FIG. 5.

FIGS. 5 and 6 show a third embodiment of a friction component manufacturing apparatus according to this invention wherein the friction component has a three-layer structure. According to this embodiment, a thicker portion 3c is formed in the middle of a first slide plate 3, and the void 3a is formed in this portion 3c to eliminate the need for the separate bottom plate 4. The void 3a includes a recessed portion 3d in which a boss section is formed, and the first slide plate 3 can be split into two at the center of the recessed portion 3d in both lateral directions. In addition, a second slide plate 16 is provided on the first slide plate 3, and a void 16a is formed in the second slide plate 16. The second slide plate 16 can also be moved in the horizontal direction. The void 16a constitutes a hole penetrating the second slide plate 16, and the first slide plate 3 also acting as a bottom plate for the void 16a.

A second hopper 17 is provided on the left of the second slide plate 16 and accommodates a second powdery material 18 inside. The lower end surface 17b of the hopper 17 forming an output port 17a is flat and is blocked by the second slide plate 16.

The operation of this apparatus is described below with reference to FIGS. 6 to 10. As shown in FIG. 6, the first slide plate 3 moves rightward in the figure while the second slide plate 16 moves leftward, so that the void 3a is moved beneath the output port 6a in the hopper 6 while the void 16a is moved beneath the output port 17a in the second hopper 17. The slide plate then oscillates in the lateral direction to carry out leveling between itself and the output port in the corresponding hopper to receive a sufficient amount of powdery material 8 or 18. Since the first slide plate 3 is located under the void 16a, the bottom of the void is blocked.

Figure 7:
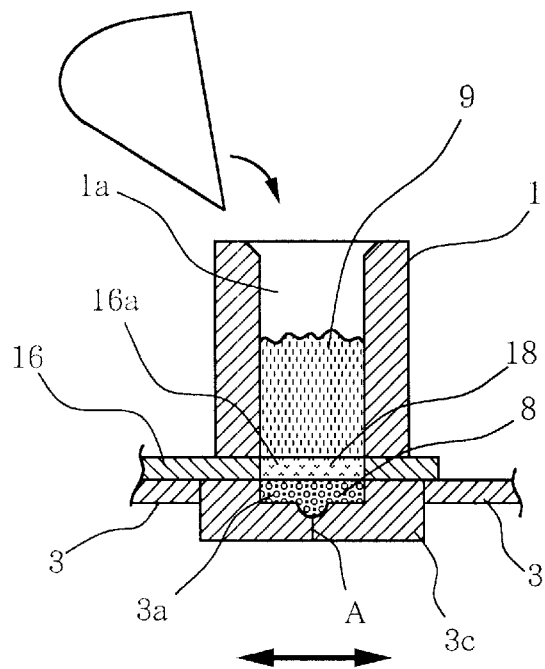
FIG. 7 shows an operation of the manufacturing apparatus in FIG. 5.

Thus, once the powdery materials have been filled in the voids 3a and 16a in the first and second slide plates, respectively, each slide plate moves as shown in FIG. 7 to allow the voids 3a and 16a to overlap each other. A predetermined weighed amount of third powdery material 9 is then fed into the molding box 1 from above and is leveled.

Figure 8:
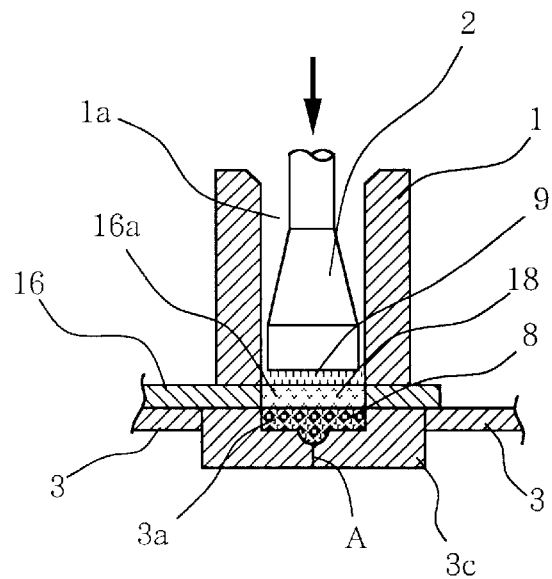
FIG. 8 shows an operation of the manufacturing apparatus in FIG. 5.
Figure 9:
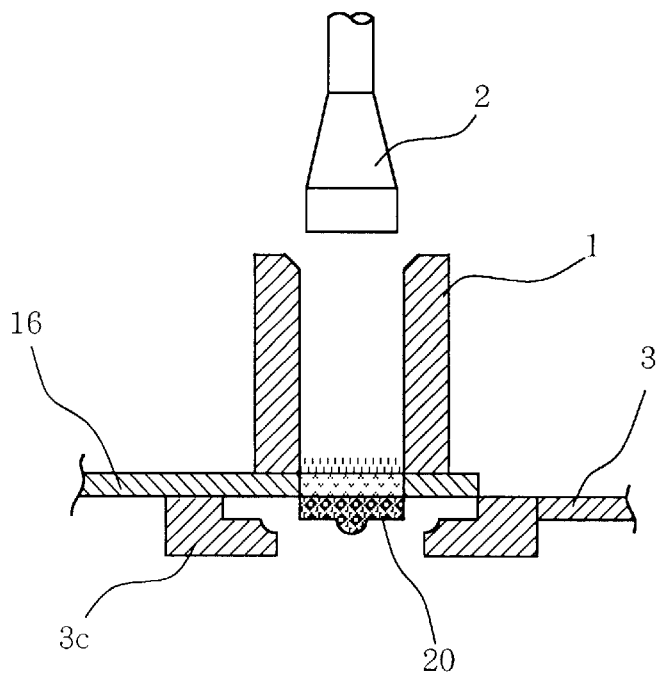
FIG. 9 shows an operation of the manufacturing apparatus in FIG. 5.
Figure 10:
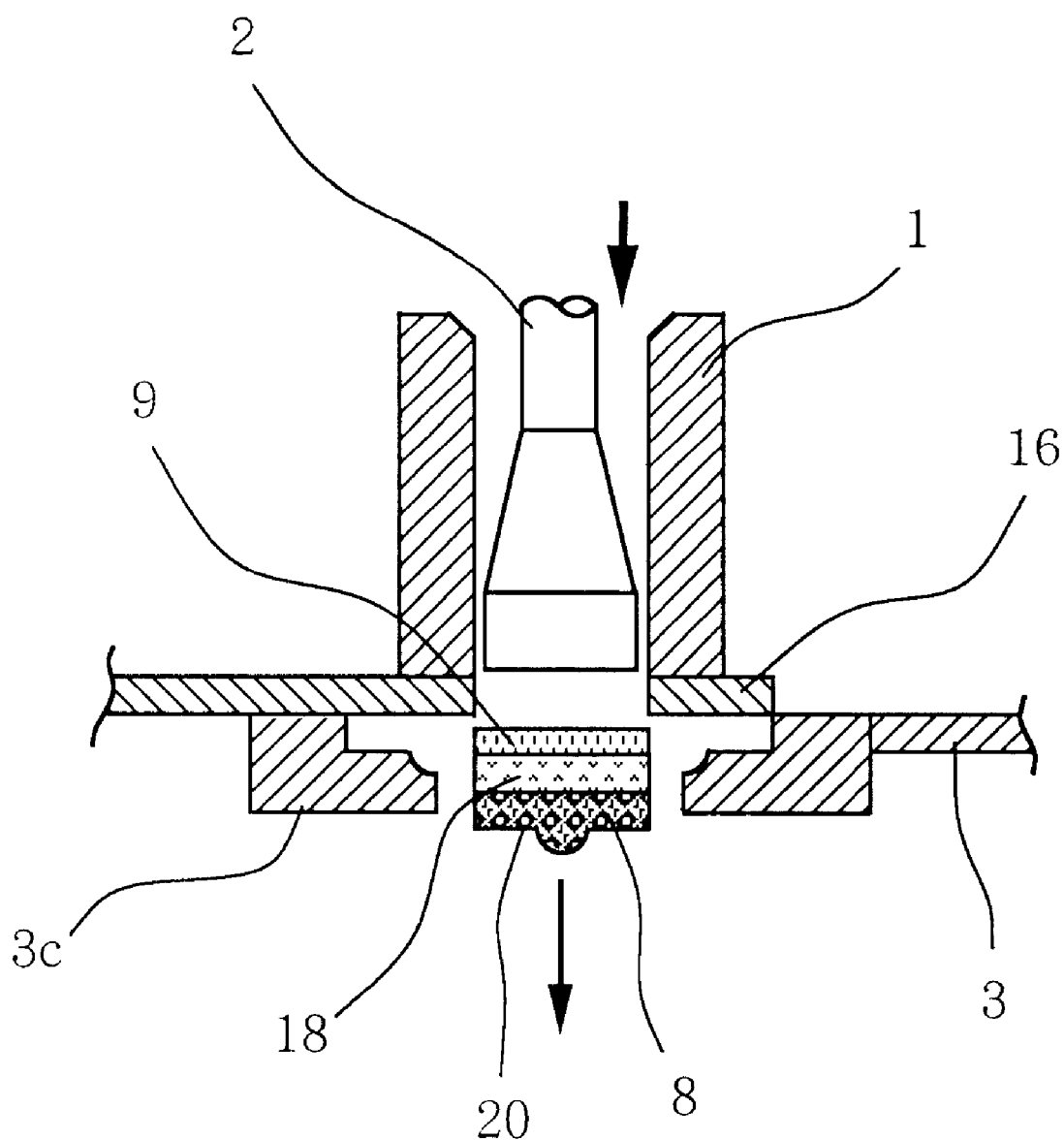
FIG. 10 shows an operation of the manufacturing apparatus in FIG. 5.

Then, as shown in FIG. 8, the plunger 2 is lowered to pressurize the material in order to obtain a temporary molding. After temporary molding, the plunger 2 is elevated and the first slide plate 3 is split at the center in both lateral directions, as shown in FIG. 9. The plunger 2 is then lowered again to drop the temporary molding 20 downward, thereby ejecting it from the apparatus, as shown in FIG. 10.

The temporary molding 20 obtained has three layers of the powdery materials 8, 18, and 9 laminated in this order from the bottom. A desired configuration can be obtained; of the three layers of friction materials, the bottom layer of the powdery material 8 may be an adhesive layer, the top layer of the powdery material 9 may have an excellent friction characteristic, and the intermediate layer of the powdery material 18 may have a high adiabatic effect.

Figure 11A:
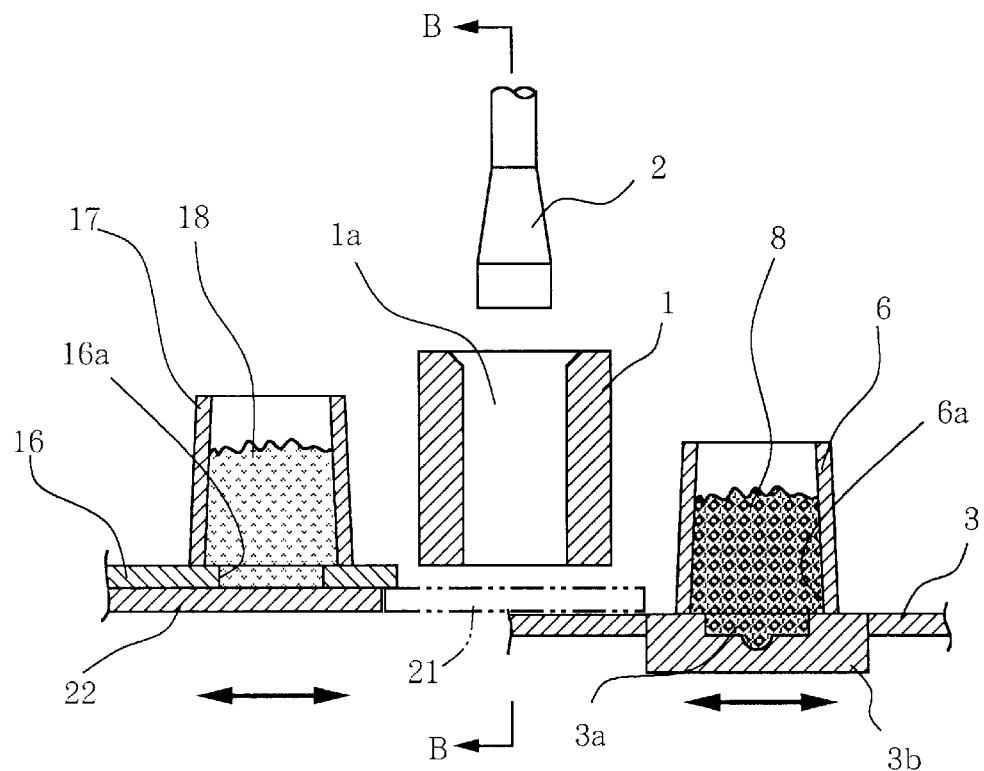
FIG. 11(a) and FIG. 11(b) is a vertical sectional view showing a fourth embodiment of a friction component manufacturing apparatus according to this invention.
Figure 11B:
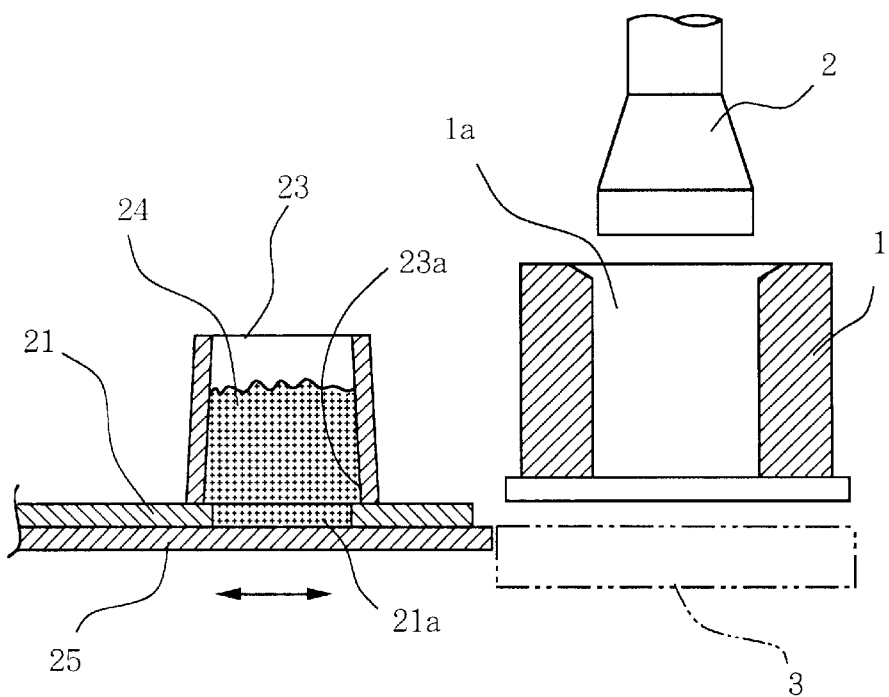
Figure 12:
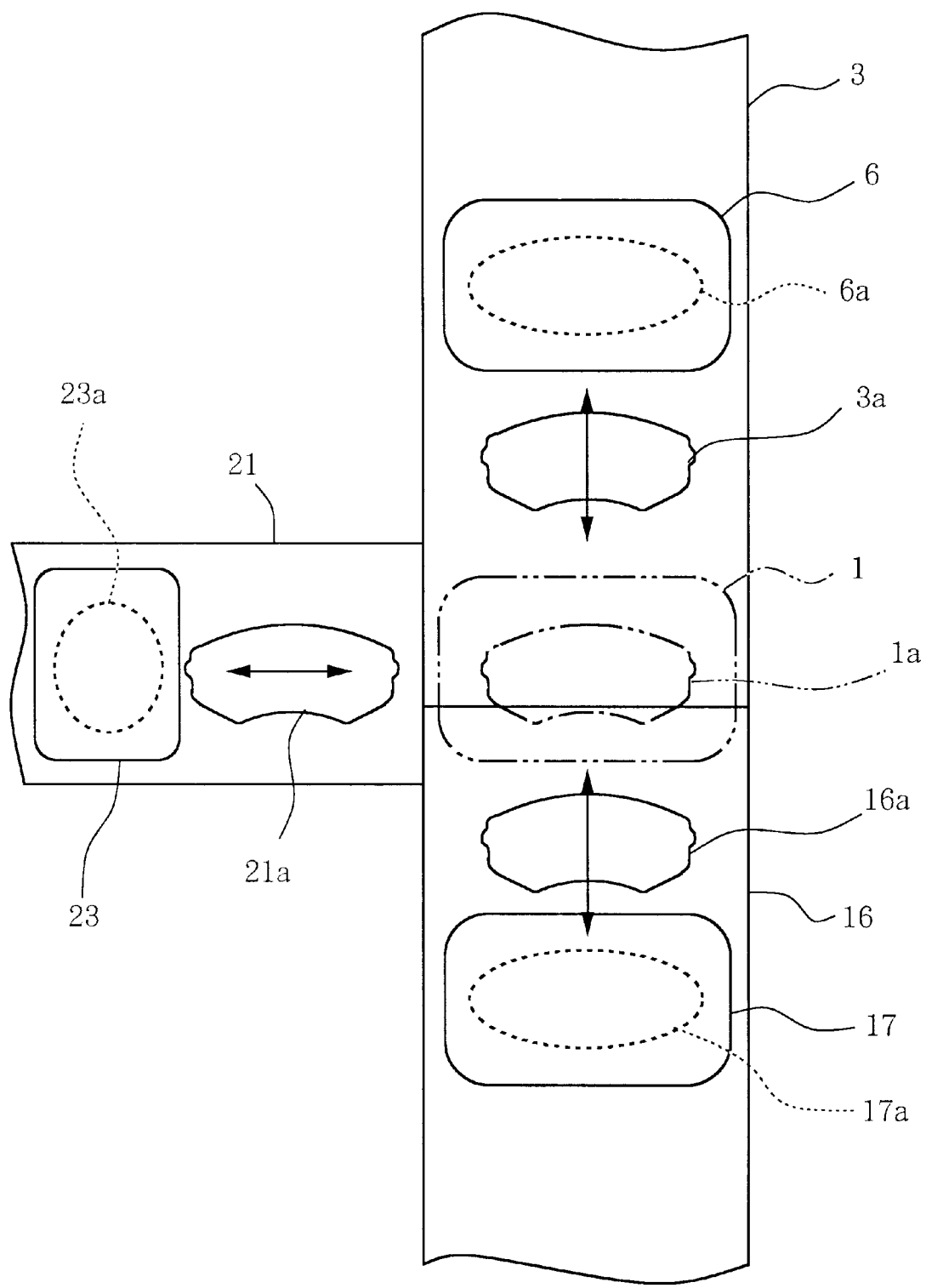
FIG. 12 is a top view of the manufacturing apparatus in FIG. 11(a).

FIG. 11(a), FIG. 11(b) and FIG. 12 show a fourth embodiment of this invention which is an example of a four-layer structure. FIG. 11(a) is a vertical sectional view, FIG. 11(b) is a sectional view taken along line B—B in FIG. 11(a), and FIG. 12 is a top view. According to this embodiment, a third slide plate 21 is inserted between the first and second slide plates 3 and 16. A void 21a is formed in the third slide plate 21 and consists of a hole penetrating the plate 21. In FIG. 12, the slide plates 3, 16, and 21 are moved so that the voids 3a, 16a, and 21a can be seen from above. As shown in FIG. 12, the voids 3a, 16a, and 21a all have the same size and shape as seen from above.

Although the first slide plate 3a has no bottom plate, it may use the bottom plate 4 as in the embodiment shown in FIG. 1. According to the embodiment in FIG. 5, the first slide plate 3 also acts as the bottom plate of the second slide plate 16, whereas this embodiment uses a separate bottom plate 22 due to the difference in height.

The third slide plate 21 moves in the direction perpendicular to the moving direction of the first and second slide plates 3 and 16. In addition, the bottom plate 25 is located at the same height as the first slide plate 3, but is independent of the first slide plate 3 because the moving direction of the first slide plate 3 is perpendicular to that of the third slide plate 21. The bottom plates 22 and 25 may slide in the same direction as the corresponding slide plates located thereon or may be fixed. The slide plate and the bottom plate located thereunder, however, must be able to slide mutually to perform leveling.

A third hopper 23 is placed on the third slide plate 21. An output port 23a in the third hopper 23 is open over the void 21a in the third slide plate 21 while being blocked by the third slide plate 21 at the other positions. A powdery material 24 is filled into the third hopper 23.

The slide plates 16 and 21 can each be configured so as to be split into two as in the first slide plate 3. Furthermore, the first slide plate 3 may not have a two-piece structure but may be moved in the vertical direction relative to the molding box 1, so that the temporary molding is taken out from the gap between the molding box 1 and the first slide plate 3.

The operation of the manufacturing apparatus according to the fourth embodiment is similar to that of the third embodiment, so its description is omitted.

As described above, this invention can provide a friction component of a multilayer structure in which each layer can be formed so as to have a specified thickness. In particular, it is very cumbersome to level a thin layer, so the omission of this leveling operation has a significant effect. In addition, the multilayer structure enables powdery materials of different compositions to be used for different layers, thereby providing a friction component having a desired distribution of compositions.

When the bottom layer is an adhesive layer, it can be formed so as to have a small specified thickness, thereby providing a friction component that has a stable frictional force such that the adhesive layer is not exposed even when the friction material on the surface is worn. In addition, in contrast to the conventional technique, this invention does not require an apparatus for weighing powdery materials, thereby simplifying both the apparatus and associated operations.

In addition, when the material contains 4% or less of fibrous material of 500 $\mu$m or more fiber length and 2 to 30% of adhesive organic filler, a satisfactory leveling capability can be obtained.

By mixing 1.5 to 3.0% of metal fibers into the adhesive layer, the hot strength of the friction component can be maintained easily.

What is claimed is:

1. An apparatus for manufacturing a friction component having a multilayer structure by feeding sequentially two or more types of powdery materials into a molding box, executing either vertical pressurization or pressurization and heating between a fixed mold and a plunger that can elevate up and down into the molding box, so as to form a temporary molding or a molding, characterized in that:

a slide plate having a void of a predetermined shape formed therein is provided between said molding box and said fixed mold, in that a hopper for the powdery materials having an output port is provided on the slide plate, and in that the slide plate can be moved in the horizontal direction so that the output port is open over said void in said slide plate while being blocked at other positions.

2. An apparatus for manufacturing a friction component according to claim 1 characterized in that said void is a hole formed so as to penetrate said slide plate and in that a bottom plate that blocks the bottom of the hole is provided so as to slide over the slide plate.

3. An apparatus for manufacturing a friction component according to claim 1 characterized in that said slide plate is a split mold.

4. An apparatus for manufacturing a friction component according to claim 2 characterized in that said slide plate and/or said bottom plate is a split mold.

5. An apparatus for manufacturing a friction component according to claim 2 characterized in that a back plate holding section in communication with said void is formed in the lower part of said slide plate.

6. An apparatus for manufacturing a friction component according to claim 1 characterized in that one or two or more slide plates are placed on said slide plate so as to move independently in the horizontal direction, in that a hole constituting part of said void is formed in each of the overlapping plates so as to penetrate them, in that a bottom plate blocking the bottom of each void is slidably provided, in that a hopper for the powdery material having an output port is provided in each slide plate, and in that the output port is open over said void in the slide plate while being blocked at the other positions.

* * * * *